UNITED STATES PATENT OFFICE.

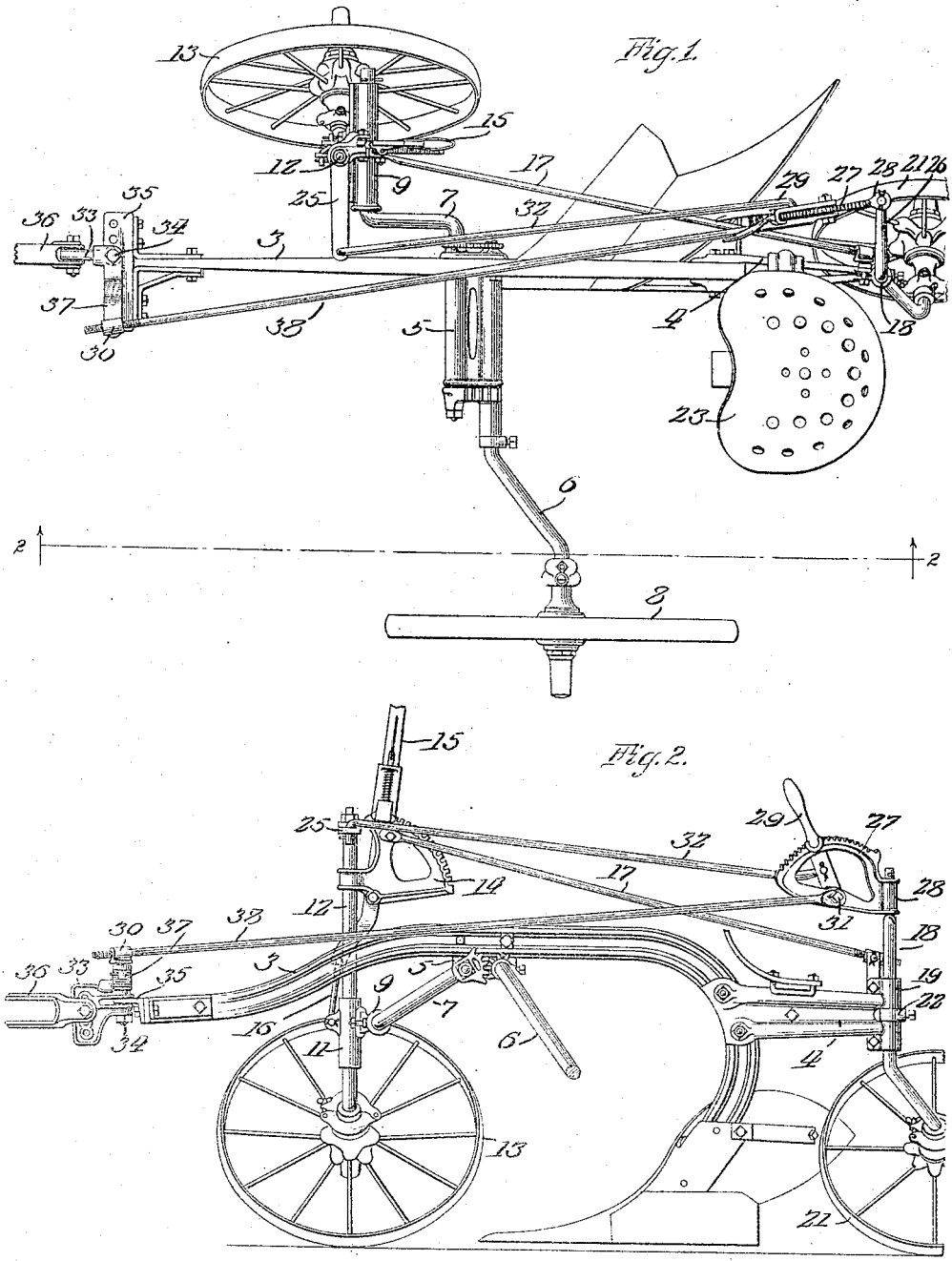

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

WHEELED PLOW.

1,194,582.      Specification of Letters Patent.      Patented Aug. 15, 1916.

Application filed May 17, 1915. Serial No. 28,801.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

This invention relates to wheeled plows commonly known as sulky plows, which comprise front and rear furrow wheels adapted to swing about vertical axes relatively to the plow frame and connected to a laterally swinging draft device by which the direction of travel of said furrow wheels is normally varied and controlled in conformity with variations in the direction of the line of draft.

In wheeled plows of this character it is customary to mount the front and rear furrow wheels on axles provided with upright spindles journaled on the plow frame and to provide the spindles with laterally extending arms which are connected together so that the spindles will turn in unison to angle or vary the direction of travel of both furrow wheels simultaneously. In addition to this provision for simultaneously swinging the furrow wheels in conformity with the swinging movements of the draft device, it has been customary to provide means for adjusting the furrow wheels about their vertical axes relatively to each other. The connections between the furrow wheels and swinging draft device as heretofore constructed, have been such that this relative adjustment of the wheels could not be conveniently and quickly effected.

One of the primary objects of my invention, therefore, is to provide an improved furrow wheel controlling and adjusting means, whereby the front and rear furrow wheels may be readily and easily adjusted relatively to each other by the driver without leaving his seat on the plow.

Another object of my invention is to provide a furrow-wheel controlling and adjusting means of improved construction which may be manufactured at a low cost.

Referring to the drawings, illustrating one preferred embodiment of my invention—Figure 1 is a plan view of a wheeled plow embodying my improvements; and Fig. 2 is a side elevation of the plow.

My improvements may be applied to any wheeled plow having front and rear angularly adjustable furrow wheels, and consequently the particular frame structure and means for raising and lowering the plow, illustrated on the drawing, form no part of this invention, these features constituting the subject matter of an application filed by me April 12, 1915, bearing Serial No. 20,856.

The plow, as shown, comprises a plow beam designated by reference character 3, provided at its rear end with a bracket 4 to which the rear furrow wheel is attached, and at its central portion with a transversely extending bracket 5 in which is journaled a pair of crank members 6 and 7. On the crank member 6 is journaled a land wheel 8, and the crank member 7 has pivotally mounted thereon a sleeve 9 to which is adjustably secured an upright bearing 11. A spindle 12 slidably and rotatably mounted in said bearing is turned laterally at its lower end to form an axle on which is journaled the front furrow wheel 13, and has secured to its upper end a toothed quadrant 14 carrying an adjustable hand lever 15 coöperating therewith and connected at its lower end by means of a link 16, with the sleeve 11, whereby the front furrow wheel may be adjusted vertically with respect to its crank 7. A rod 17 connecting the quadrant 14 with the bracket 4 holds the spindle 12 in upright position. Means (not shown) are provided for rocking the crank members 6 and 7 to raise and lower the plow.

An upright spindle 18 journaled in a sleeve 19 integral with the bracket 4 is turned laterally at its lower end to form an axle upon which is journaled the rear furrow wheel 21, the spindle being held against longitudinal movement by a collar 22. A seat bar mounted on the bracket 4 supports a seat 23 in proximity to, but in front of and landwardly of the rear furrow wheel spindle.

My improvements, which relate to the means for controlling and guiding the furrow wheels in their angular swinging movements, will now be described. An arm 25 fixedly secured to the upper end of the furrow wheel spindle 12 and extending landwardly therefrom is adjustably connected at its outer end with the outer end of an arm 26 integral with the rear furrow wheel spindle 18 and extending furrow-wardly therefrom. The means adjustably connecting said arms 25 and 26 comprises a toothed quadrant 27 formed with a sleeve 28 embracing an upturned end of the arm 26 and held from displacement by a cotter-pin or any suitable means, a hand lever 29 pivotally mounted at 21 on the quadrant and provided with the usual spring-actuated locking detent coöperating with the toothed face of the quadrant, and a link 32 pivotally connected at its forward end to the outer end of the arm 25 and at its rear end to the hand lever 29 intermediate the ends thereof. It will be obvious that by adjustment of the hand lever 29 the furrow wheels may be angled or swing about their vertical axes relatively to each other in opposite directions and that when the hand lever is set in any adjusted position, the furrow wheels will be maintained in predetermined relation, but will be permitted to swing in unison under the control of the draft device.

The angular relation of the furrow wheels with respect to the plow is controlled by and through the draft means, which includes a laterally swinging draft device connected with the spindle arms so that the furrow wheels will move angularly in accordance with the angular or lateral movement of the draft device, such automatic angling of the furrow wheels being especially desirable when turning the plow in the field at the end or corner of a furrow. The draft means may be either of the tongue or clevis type, both of which are well known in this art. In the present instance, I have illustrated the latter, which comprises a clevis 33 pivotally attached by means of an upright pivot bolt 34, to a clevis bracket 35 fixedly secured to the front end of the plow beam, the pivot bolt being adjustable laterally on said bracket. An evener yoke 36 is adjustably attached to the clevis. Fixedly secured to the clevis and extending landwardly therefrom is an arm 37, to the outer end of which is pivotally attached an internally threaded eye or collar 30 adapted to threadedly receive the forward end of a rod or link 38, which in turn is connected at its rear end to the pivot bolt 31 on the quadrant 27. The longitudinal adjustment of the rod 38 with respect to the arm 37 permits the clevis to be properly adjusted relatively to the furrow wheels.

It will be apparent from the foregoing that upon lateral swinging movement of the clevis, the furrow wheels will be angled correspondingly, so that the angular relation of the furrow wheels with respect to the plow is controlled by the draft while the relative adjustment of the wheels may be varied by manipulation of the lever 29. It will be further noted that the adjusting lever 29 is conveniently located with respect to the driver's seat, so that angular adjustment of the furrow wheels may be readily and easily made, and that the lever is so positioned that, as it is carried forwardly and backwardly with the quadrant when the furrow wheels are automatically swung by the draft device, it does not interfere with the driver. It will also be apparent that my improved construction, including the quadrant and lever, while very simple and effective, may be easily manufactured and assembled.

I claim:

1. In a wheeled plow, the combination of a frame, a front and a rear furrow wheel therefor connected with spindles journaled in upright bearings on the frame so that the wheels may be angularly adjustable, the rear spindle having a laterally projecting arm at its upper end, a notched quadrant pivotally connected on an upright axis directly to the outer end of said arm, a lever pivoted to and coöperating with the quadrant, and a link pivotally connecting the lever with the front spindle whereby the connection between the front and rear spindle is solely through the said link, lever and quadrant so that the spindles will turn in unison.

2. In a wheeled plow, the combination of a frame, a front and a rear furrow wheel therefor, mounted on axles having upright spindles so that wheels may be angularly adjusted, means connecting said spindles causing them to turn in unison comprising laterally extending arms fixed to the spindles, a toothed quadrant pivotally mounted directly on the rear arm, a lever mounted upon and coöperating with said quadrant and a link connection between the lever and front spindle, a laterally swinging draft device, and a link connection directly between said draft device and said quadrant to angle and adjust said wheels by the draft.

3. In a wheeled plow, the combination of a frame, a front and a rear furrow wheel therefor connected with upright spindles so as to be angularly adjustable, the rear spindle having its upper end bent to form a laterally projecting arm and thence upwardly terminating in an upright end, a notched quadrant and a tubular collar integral therewith, which collar receives the said upright end of the rear spindle arm so as to pivotally secure the quadrant to said arm, a lever pivoted to and coöperating with said quadrant, a link connection between said lever and the front spindle whereby the front and rear furrow wheel spindles will turn in unison, and means for maintaining the quadrant substantially in longitudinal alinement with the said link.

LEWIS E. WATERMAN.